United States Patent
Kim et al.

(10) Patent No.: US 9,277,194 B2
(45) Date of Patent: *Mar. 1, 2016

(54) METHOD AND APPARATUS FOR IMAGE AND VIDEO CODING USING HIERARCHICAL SAMPLE ADAPTIVE BAND OFFSET

(71) Applicant: Texas Instruments Incorporated, Dallas, TX (US)

(72) Inventors: Woo-Shik Kim, Dallas, TX (US); Do-Kyoung Kwon, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/671,722

(22) Filed: Nov. 8, 2012

(65) Prior Publication Data

US 2013/0114909 A1  May 9, 2013

Related U.S. Application Data

(60) Provisional application No. 61/557,036, filed on Nov. 8, 2011, provisional application No. 61/593,578, filed on Feb. 1, 2012, provisional application No. 61/595,777, filed on Feb. 7, 2012, provisional application No. 61/618,264, filed on Mar. 30, 2012, provisional application No. 61/623,790, filed on Apr. 13, 2012.

(51) Int. Cl.
| | |
|---|---|
| *H04N 7/16* | (2011.01) |
| *H04N 19/00* | (2014.01) |
| *H04N 19/463* | (2014.01) |
| *H04N 19/82* | (2014.01) |

(52) U.S. Cl.
CPC ............... *H04N 7/26* (2013.01); *H04N 19/463* (2014.11); *H04N 19/82* (2014.11)

(58) Field of Classification Search
CPC .................. H04N 19/00896; H04N 19/00066; H04N 19/00884; H04N 19/00909; H04N 19/00551; H04N 19/00278; H04N 19/00951; H04N 19/00303; H04N 19/00533; H04N 19/00006; H04N 19/00121; H04N 19/00127; H04N 19/00; H04N 7/26
USPC .................................................. 382/239–240
See application file for complete search history.

(56) References Cited

U.S. PATENT DOCUMENTS

| | | | | |
|---|---|---|---|---|
| 8,995,535 | B2 * | 3/2015 | Sze et al. | 375/240.26 |
| 2012/0082241 | A1 * | 4/2012 | Tsai et al. | 375/240.25 |
| 2012/0082244 | A1 * | 4/2012 | Chen et al. | 375/240.29 |
| 2012/0177103 | A1 * | 7/2012 | Fu et al. | 375/240.02 |
| 2012/0207227 | A1 * | 8/2012 | Tsai et al. | 375/240.29 |
| 2012/0287988 | A1 * | 11/2012 | Chong et al. | 375/240.02 |
| 2013/0022103 | A1 * | 1/2013 | Budagavi | 375/240.02 |
| 2013/0051454 | A1 * | 2/2013 | Sze et al. | 375/240.02 |

(Continued)

OTHER PUBLICATIONS

U.S. Appl. No. 61/497,045 English Translation.

*Primary Examiner* — Jingge Wu
(74) *Attorney, Agent, or Firm* — Charles A. Brill; Frank D. Cimino

(57) ABSTRACT

A method and apparatus for image coding using hierarchical sample adaptive band offset. The method includes decoding a signal of a portion of an image, determining a band offset type and offset of a portion of the image, utilizing the band offset type and offset to determine a sub-band, and reconstructing a pixel value according to the determined offset value.

20 Claims, 4 Drawing Sheets

(56) References Cited

U.S. PATENT DOCUMENTS

| | | | |
|---|---|---|---|
| 2013/0077696 A1* | 3/2013 | Zhou | 375/240.24 |
| 2013/0114678 A1* | 5/2013 | Baylon et al. | 375/240.02 |
| 2013/0114681 A1* | 5/2013 | Zhao et al. | 375/240.03 |
| 2013/0114694 A1* | 5/2013 | Chen et al. | 375/240.03 |
| 2013/0188741 A1* | 7/2013 | Minoo et al. | 375/240.26 |
| 2014/0098859 A1* | 4/2014 | Lim et al. | 375/240.12 |
| 2014/0119433 A1* | 5/2014 | Park et al. | 375/240.02 |

* cited by examiner

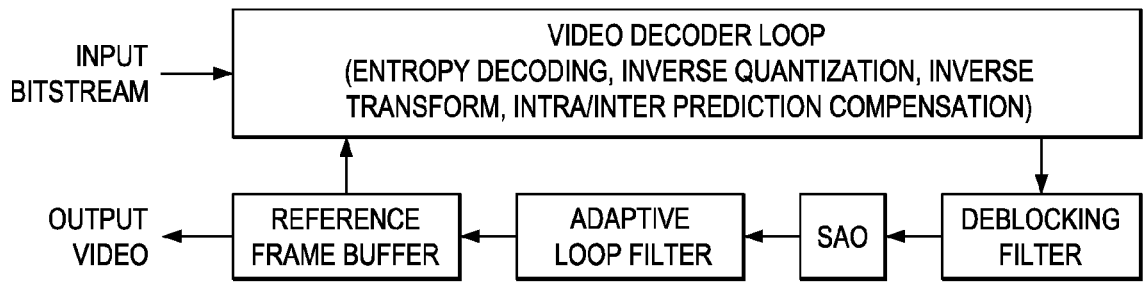
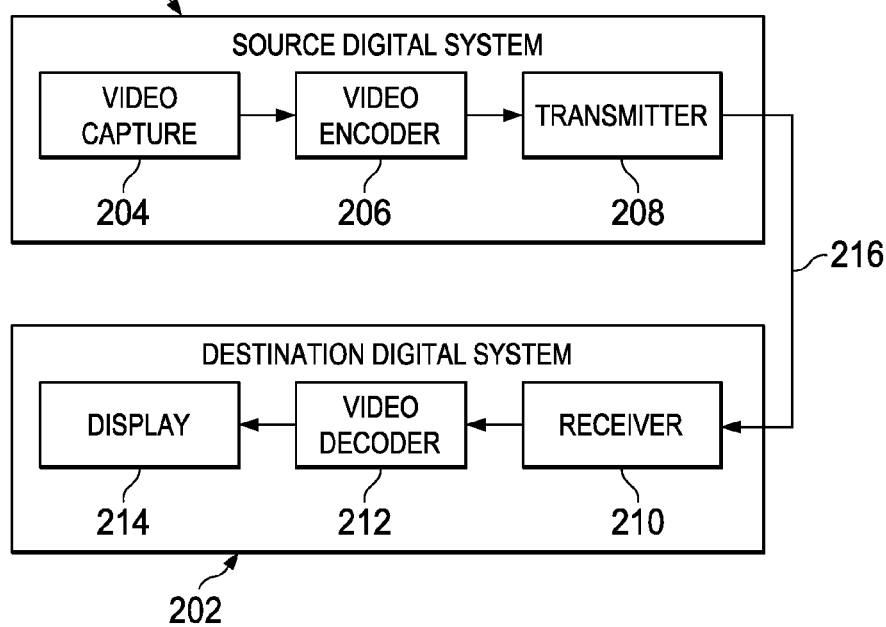

METHOD AND APPARATUS FOR IMAGE AND VIDEO CODING USING HIERARCHICAL SAMPLE ADAPTIVE BAND OFFSET

CROSS-REFERENCE TO RELATED APPLICATIONS

This application claims benefit of U.S. provisional patent application Ser. No. 61/557,036, filed Nov. 8, 2011, 61/593,578, filed Feb. 1, 2012, 61/595,777, filed Feb. 7, 2012, 61/618,264, filed Mar. 30, 2012, and 61/623,790, filed Apr. 13, 2012, which are herein incorporated by reference.

BACKGROUND OF THE INVENTION

1. Field of the Invention

Embodiments of the present invention generally relate to a method and apparatus for image and video coding using hierarchical sample adaptive band offset.

2. Description of the Related Art

Sample adaptive offset (SAO) was introduced for the next generation video coding standard called high efficiency video coding (HEVC). FIG. 1 is an embodiment depicting a block diagram for decoding Architecture of high efficiency video coding with adaptive loop filtering (ALF) and sample adaptive offset. As shown in FIG. 1, SAO is applied after deblocking filtering process, usually, before adaptive loop filtering (ALF).

SAO involves adding an offset directly to the reconstructed pixel from the video decoder loop in FIG. 1. The offset value applied to each pixel depends on the local characteristics surrounding that pixel. There are two kinds of offsets, namely band offset (BO) and edge offset (EO). BO classifies pixels by intensity interval of the reconstructed pixel, while EO classifies pixels based on edge direction and structure. In certain cases, the number of pixels increases but the number of bands stays the same. As a result, the system becomes less efficient.

Therefore, there is a need for an improved method and/or apparatus for a more efficient image and video coding using hierarchical sample adaptive band offset.

SUMMARY OF THE INVENTION

Embodiments of the present invention relate to a method and apparatus for image coding using hierarchical sample adaptive band offset. The method includes decoding a signal of a portion of an image, determining a band offset type and offset of a portion of the image, utilizing the band offset type and offset to determine a sub-band, and reconstructing a pixel value according to the determined offset value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is an embodiment depicting a block diagram for decoding architecture of high efficiency video coding with adaptive loop filtering and sample adaptive offset;

FIG. 2 is a block diagram of a digital system;

DETAILED DESCRIPTION

Figure 3:
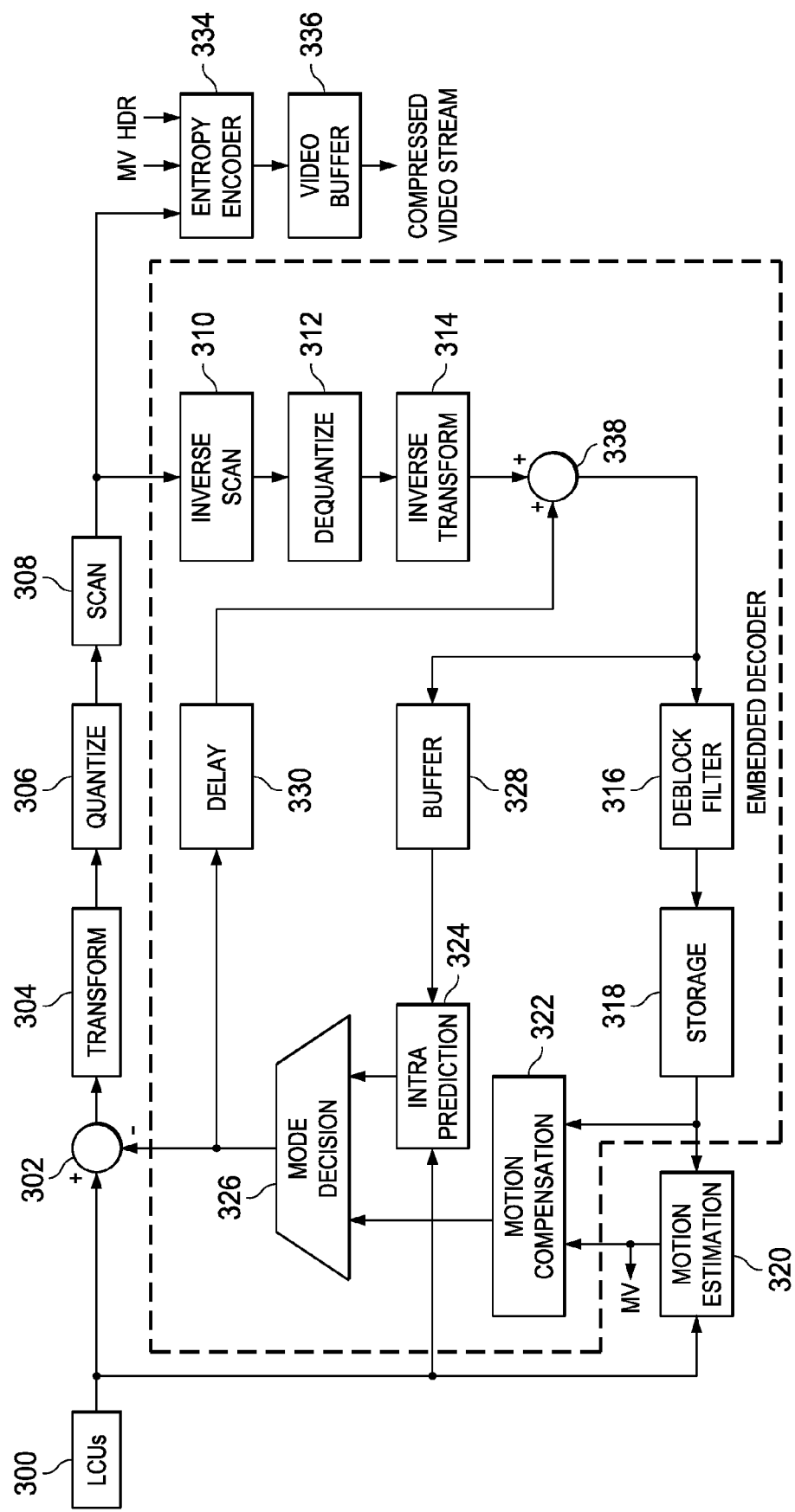
FIG. 3 is a block diagram of a video encoder.

FIG. 2 is a block diagram of a digital system. FIG. 2 shows a block diagram of a digital system that includes a source digital system 200 that transmits encoded video sequences to a destination digital system 202 via a communication channel 216. The source digital system 200 includes a video capture component 204, a video encoder component 206, and a transmitter component 208. The video capture component 204 is configured to provide a video sequence to be encoded by the video encoder component 206. The video capture component 204 may be, for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into largest coding units (LCUs), and encodes the video data in the LCUs. An embodiment of the video encoder component 206 is described in more detail herein in reference to FIG. 3.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the LCUs of the video sequence.

The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video steaming, video broadcasting, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

FIG. 3 is a block diagram of a video encoder. FIG. 3 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU CU structure for each CU and provides information regarding this initial LCU CU structure to the various components of the video encoder as needed. The coding control component also may determine the initial prediction unit and TU structure for each CU and provides information regarding this initial structure to the various components of the video encoder as needed.

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 300 from the coding control unit are provided as one input of a motion estimation component 320, as one input of an intra-prediction component 324, and to a positive input of a combiner 302 (e.g., adder or subtractor or the like). Further, although not specifically shown, the prediction mode of each picture as selected by the coding control component is provided to a mode selector component and the entropy encoder 334.

The storage component 318 provides reference data to the motion estimation component 320 and to the motion compensation component 322. The reference data may include one or more previously encoded and decoded CUs, i.e., reconstructed CUs.

The motion estimation component 320 provides motion data information to the motion compensation component 322 and the entropy encoder 334. More specifically, the motion estimation component 320 performs tests on CUs in an LCU based on multiple inter-prediction modes (e.g., skip mode, merge mode, and normal or direct inter-prediction) and transform block sizes using reference picture data from storage 318 to choose the best motion vector(s)/prediction mode based on a rate distortion coding cost. To perform the tests, the motion estimation component 320 may begin with the CU structure provided by the coding control component. The motion estimation component 320 may divide each CU indicated in the CU structure into prediction units according to the unit sizes of prediction modes and into transform units according to the transform block sizes and calculate the coding costs for each prediction mode and transform block size for each CU. The motion estimation component 320 may also compute CU structure for the LCU and PU/TU partitioning structure for a CU of the LCU by itself.

For coding efficiency, the motion estimation component 320 may also decide to alter the CU structure by further partitioning one or more of the CUs in the CU structure. That is, when choosing the best motion vectors/prediction modes, in addition to testing with the initial CU structure, the motion estimation component 320 may also choose to divide the larger CUs in the initial CU structure into smaller CUs (within the limits of the recursive quadtree structure), and calculate coding costs at lower levels in the coding hierarchy. If the motion estimation component 320 changes the initial CU structure, the modified CU structure is communicated to other components that need the information.

The motion estimation component 320 provides the selected motion vector (MV) or vectors and the selected prediction mode for each inter-predicted prediction unit of a CU to the motion compensation component 322 and the selected motion vector (MV), reference picture index (indices), prediction direction (if any) to the entropy encoder 334

The motion compensation component 322 provides motion compensated inter-prediction information to the mode decision component 326 that includes motion compensated inter-predicted PUs, the selected inter-prediction modes for the inter-predicted PUs, and corresponding transform block sizes. The coding costs of the inter-predicted prediction units are also provided to the mode decision component 326.

The intra-prediction component 324 provides intra-prediction information to the mode decision component 326 that includes intra-predicted prediction units and the corresponding intra-prediction modes. That is, the intra-prediction component 324 performs intra-prediction in which tests based on multiple intra-prediction modes and transform unit sizes are performed on CUs in an LCU using previously encoded neighboring prediction units from the buffer 328 to choose the best intra-prediction mode for each prediction unit in the CU based on a coding cost.

To perform the tests, the intra-prediction component 324 may begin with the CU structure provided by the coding control. The intra-prediction component 324 may divide each CU indicated in the CU structure into prediction units according to the unit sizes of the intra-prediction modes and into transform units according to the transform block sizes and calculate the coding costs for each prediction mode and transform block size for each PU. For coding efficiency, the intra-prediction component 324 may also decide to alter the CU structure by further partitioning one or more of the CUs in the CU structure. That is, when choosing the best prediction modes, in addition to testing with the initial CU structure, the intra-prediction component 324 may also chose to divide the larger CUs in the initial CU structure into smaller CUs (within the limits of the recursive quadtree structure), and calculate coding costs at lower levels in the coding hierarchy. If the intra-prediction component 324 changes the initial CU structure, the modified CU structure is communicated to other components that need the information. Further, the coding costs of the intra-predicted prediction units and the associated transform block sizes are also provided to the mode decision component 326.

The mode decision component 326 selects between the motion-compensated inter-predicted prediction units from the motion compensation component 322 and the intra-predicted prediction units from the intra-prediction component 324 based on the coding costs of the prediction units and the picture prediction mode provided by the mode selector component. The decision is made at CU level. Based on the decision as to whether a CU is to be intra- or inter-coded, the intra-predicted prediction units or inter-predicted prediction units are selected, accordingly.

The output of the mode decision component 326, i.e., the predicted PU, is provided to a negative input of the combiner 302 and to a delay component 330. The associated transform block size is also provided to the transform component 304. The output of the delay component 330 is provided to another combiner (i.e., an adder) 338. The combiner 302 subtracts the predicted prediction unit from the current prediction unit to provide a residual prediction unit to the transform component 304. The resulting residual prediction unit is a set of pixel difference values that quantify differences between pixel values of the original prediction unit and the predicted PU. The residual blocks of all the prediction units of a CU form a residual CU block for the transform component 304.

The transform component 304 performs block transforms on the residual CU to convert the residual pixel values to transform coefficients and provides the transform coefficients to a quantize component 306. The transform component 304 receives the transform block sizes for the residual CU and applies transforms of the specified sizes to the CU to generate transform coefficients.

The quantize component 306 quantizes the transform coefficients based on quantization parameters (QPs) and quantization matrices provided by the coding control component and the transform sizes. The quantize component 306 may also determine the position of the last non-zero coefficient in a TU according to the scan pattern type for the TU and provide the coordinates of this position to the entropy encoder 334 for inclusion in the encoded bit stream. For example, the quantize component 306 may scan the transform coefficients according to the scan pattern type to perform the quantization, and determine the position of the last non-zero coefficient during the scanning/quantization.

The quantized transform coefficients are taken out of their scan ordering by a scan component 308 and arranged sequentially for entropy coding. The scan component 308 scans the coefficients from the highest frequency position to the lowest frequency position according to the scan pattern type for each TU. In essence, the scan component 308 scans backward through the coefficients of the transform block to serialize the coefficients for entropy coding. As was previously mentioned, a large region of a transform block in the higher frequencies is typically zero. The scan component 308 does not send such large regions of zeros in transform blocks for entropy coding. Rather, the scan component 308 starts with the highest frequency position in the transform block and scans the coefficients backward in highest to lowest frequency order until a coefficient with a non-zero value is located. Once the first coefficient with a non-zero value is located, that coefficient and all remaining coefficient values following the coefficient in the highest to lowest frequency scan order are serialized and passed to the entropy encoder 334. In some embodiments, the scan component 308 may begin scanning at the position of the last non-zero coefficient in the TU as determined by the quantize component 306, rather than at the highest frequency position.

The ordered quantized transform coefficients for a CU provided via the scan component 308 along with header information for the CU are coded by the entropy encoder 334, which provides a compressed bit stream to a video buffer 336 for transmission or storage. The header information may include the prediction mode used for the CU. The entropy encoder 334 also encodes the CU and prediction unit structure of each LCU.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 308 are returned to their original post-transform arrangement by an inverse scan component 310, the output of which is provided to a dequantize component 312, which outputs a reconstructed version of the transform result from the transform component 304.

The dequantized transform coefficients are provided to the inverse transform component 314, which outputs estimated residual information which represents a reconstructed version of a residual CU. The inverse transform component 314 receives the transform block size used to generate the transform coefficients and applies inverse transform(s) of the specified size to the transform coefficients to reconstruct the residual values.

The reconstructed residual CU is provided to the combiner 338. The combiner 338 adds the delayed selected CU to the reconstructed residual CU to generate an unfiltered reconstructed CU, which becomes part of reconstructed picture information. The reconstructed picture information is provided via a buffer 328 to the intra-prediction component 324 and to an in-loop filter component 316. The in-loop filter component 316 applies various filters to the reconstructed picture information to improve the reference picture used for encoding/decoding of subsequent pictures. The in-loop filter component 316 may, for example, adaptively apply low-pass filters to block boundaries according to the boundary strength to alleviate blocking artifacts causes by the block-based video coding. The filtered reference data is provided to storage component 318.

Figure 4:
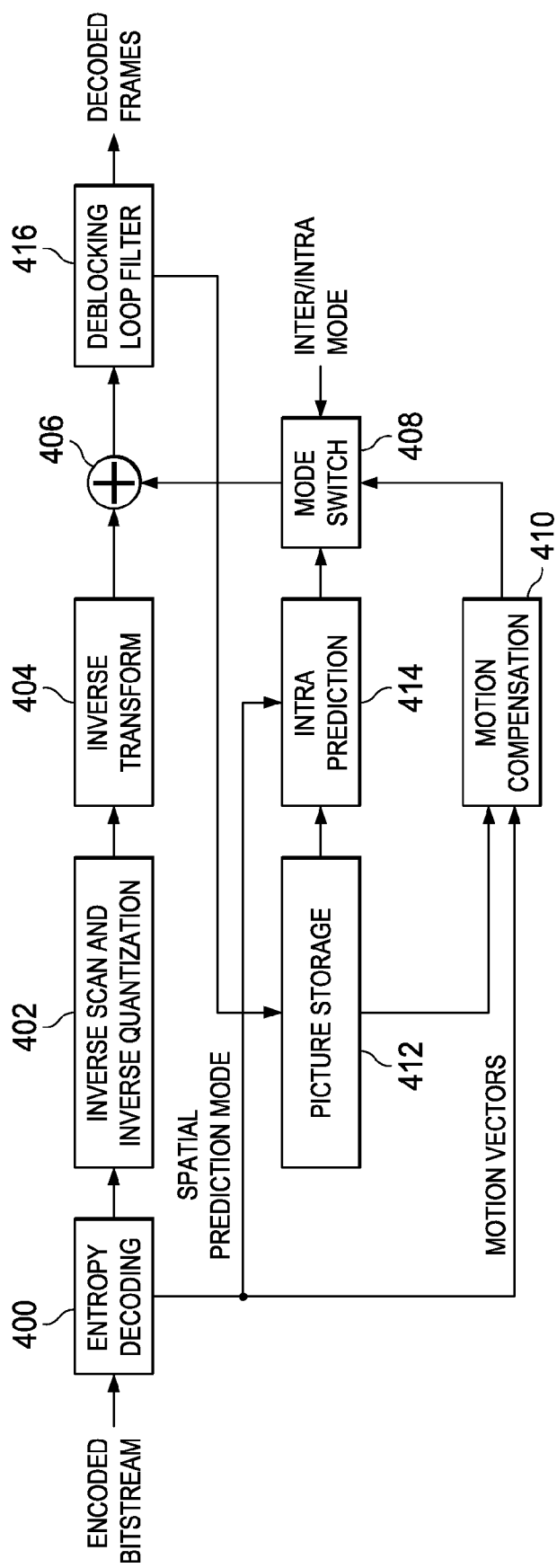
FIG. 4 is a block diagram of a video decoder.

FIG. 4 shows a block diagram of an example video decoder. The video decoder operates to reverse the encoding operations, i.e., entropy coding, quantization, transformation, and prediction, performed by the video encoder of FIG. 3 to regenerate the pictures of the original video sequence. In view of the above description of a video encoder, one of ordinary skill in the art will understand the functionality of components of the video decoder without detailed explanation.

The entropy decoding component 400 receives an entropy encoded (compressed) video bit stream and reverses the entropy coding to recover the encoded PUs and header information such as the prediction modes and the encoded CU and PU structures of the LCUs. If the decoded prediction mode is an inter-prediction mode, the entropy decoder 400 then reconstructs the motion vector(s) as needed and provides the motion vector(s) to the motion compensation component 410.

The inverse scan and inverse quantization component 402 receives entropy decoded quantized transform coefficients from the entropy decoding component 400, inverse scans the coefficients to return the coefficients to their original post-transform arrangement, i.e., performs the inverse of the scan performed by the scan component 308 of the encoder to reconstruct quantized transform blocks, and de-quantizes the quantized transform coefficients. The forward scanning in the encoder is a conversion of the two dimensional (2D) quantized transform block to a one dimensional (1D) sequence; the inverse scanning performed here is a conversion of the 1D sequence to the two dimensional quantized transform block using the same scanning pattern as that used in the encoder.

The inverse transform component 404 transforms the frequency domain data from the inverse scan and inverse quantization component 402 back to the residual CU. That is, the inverse transform component 404 applies an inverse unit transform, i.e., the inverse of the unit transform used for encoding, to the dequantized residual coefficients to produce the residual CUs.

A residual CU supplies one input of the addition component 406. The other input of the addition component 406 comes from the mode switch 408. When an inter-prediction mode is signaled in the encoded video stream, the mode switch 408 selects predicted PUs from the motion compensation component 410 and when an intra-prediction mode is signaled, the mode switch selects predicted PUs from the intra-prediction component 414.

The motion compensation component 410 receives reference data from storage 412 and applies the motion compensation computed by the encoder and transmitted in the encoded video bit stream to the reference data to generate a predicted PU. That is, the motion compensation component 410 uses the motion vector(s) from the entropy decoder 400 and the reference data to generate a predicted PU.

The intra-prediction component 414 receives reference data from previously decoded PUs of a current picture from the picture storage 412 and applies the intra-prediction computed by the encoder as signaled by the intra-prediction mode transmitted in the encoded video bit stream to the reference data to generate a predicted PU.

The addition component 406 generates a decoded CU by adding the predicted PUs selected by the mode switch 408 and the residual CU. The output of the addition component 406 supplies the input of the in-loop filter component 416. The in-loop filter component 416 performs the same filtering as the encoder. The output of the in-loop filter component 416 is the decoded pictures of the video bit stream. Further, the output of the in-loop filter component 416 is stored in storage 412 to be used as reference data.

Figure 5:
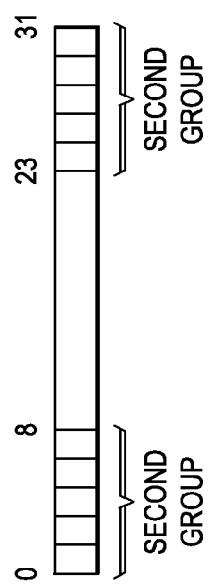
FIG. 5 is an embodiment depicting band offset group classification.

There are two kinds of offsets, namely band offset (BO) and edge offset (EO). BO classifies pixels by intensity interval of the reconstructed pixel, while EO classifies pixels based on edge direction and structure. For BO, the pixel is classified into one of two categories, the side band or central band, as shown in FIG. 5. FIG. 5 is an embodiment depicting band offset group classification.

Figure 6:
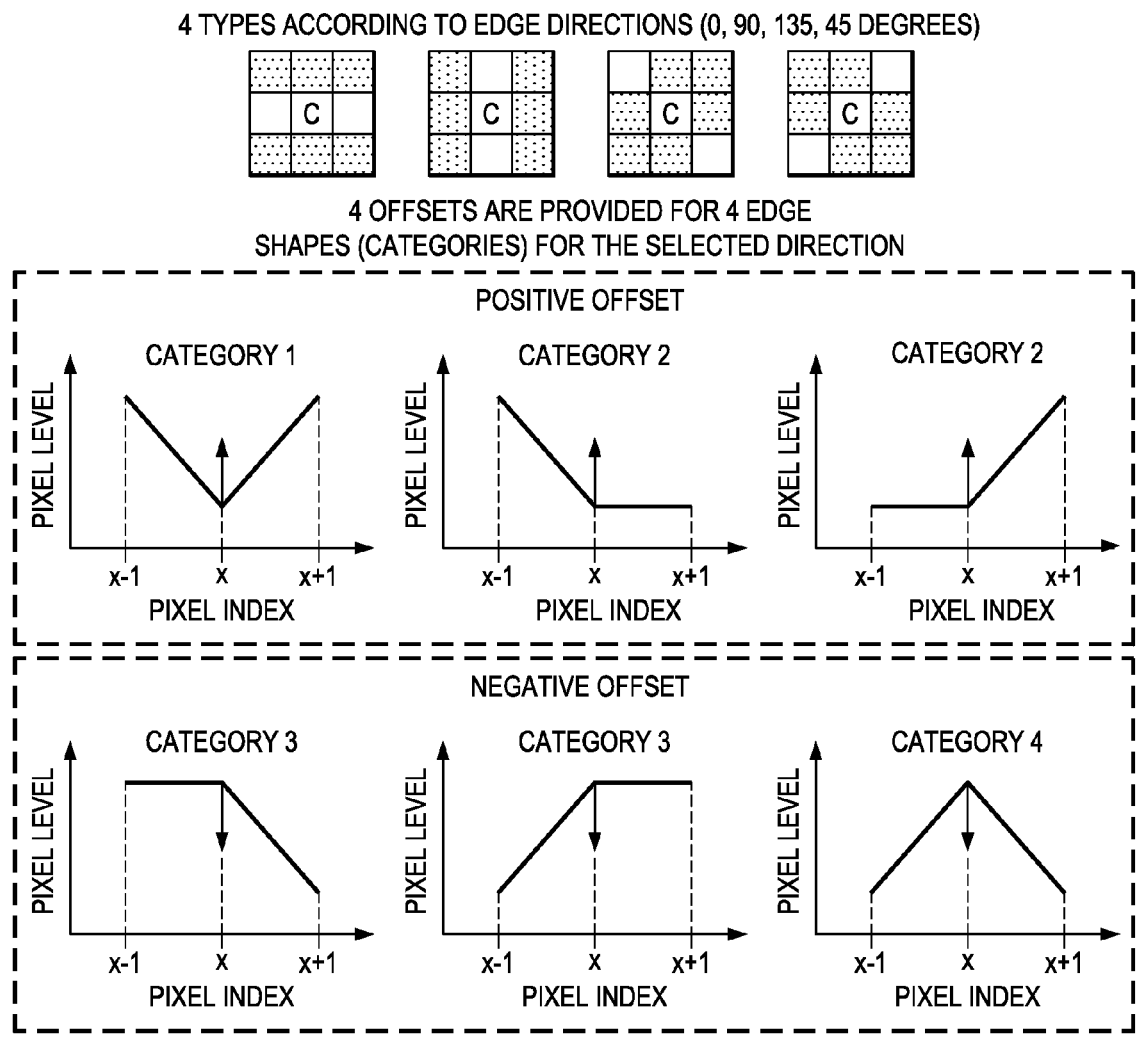
FIG. 6 is an embodiment depicting edge offset pixel classification patterns.

FIG. 6 is an embodiment depicting edge offset pixel classification patterns. For edge offset, the pixels can be filtered in one of four directions, as shown in FIG. 6. For each direction, the pixel is classified into one of five categories based on the value of c, where c is the intensity value of the current reconstructed pixel. The category number can be calculated as sign(p0−p1)+sign(p0−p2), where p0 is current pixel and p1 and p2 are neighboring pixels.

c<2 neighboring pixels;
c<1 neighbor && c==1 neighbor;
c>1 neighbor && c==1 neighbor;
c>2 neighbors; and
none of above (c=either neighbor).

On the encoder side, the SAO is LCU-based processing to estimate the offsets for a LCU. Each LCU is allowed to switch between BO and EO. Thus, the encoder can signal the following to the decoder for each LCU:

sao_type_idx=type of SAO
sao_offset=sao offset value

Table 1 describes in more detail type of SAO or speciation of NumSaoClass:

TABLE 1

| sao_type_idx | NumSaoCategory | Edge type (informative) |
|---|---|---|
| 0 | 0 | Not applied |
| 1 | 4 | 1D 0-degree edge |
| 2 | 4 | 1D 90-degree edge |
| 3 | 4 | 1D 135-degree edge |
| 4 | 4 | 1D 45-degree edge |
| 5 | 16 | Central band |
| 6 | 16 | Side band |

For each LCU, a sao_type_idx is signaled followed by offset values for each category.

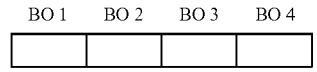

In other embodiment, when SAO type is 2, edge offset class is signalled to indicate edge direction. When SAO type is 1, band position and offset signs are signalled, as shown in table 2 below:

TABLE 2

| SaoTypeIdx[cIdx][rx][ry] | SAO type (informative) |
|---|---|
| 0 | Not applied |
| 1 | Band offset |
| 2 | Edge Offset |

In one embodiment, the band offset scheme may have a reduced number of offsets. First, the entire level is divided into bands, for example, 4 bands:

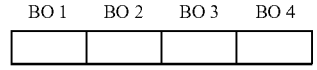

Each LCU can select one band by selecting appropriate band offset type, and selected band offset type is encoded into bitstream. For the selected band offset type, the corresponding level range is again equally divided into 8 sub-band; hence, each sub-band can have one offset. These offset values are encoded into bitstream.

At a decoder side band offset type and 8 offset values are decoded. For each pixel, it is determined in which sub-band it belongs to, and corresponding offset value is added to the reconstructed pixel value. In addition, coding efficiency improvement can be achieved since number of offset to code is reduced by half.

In one embodiment, the coverage of each band is reduced compared to the conventional approach. To resolve this issue, the offsets of the first and the last sub-band may include the pixels outside the band. The offset of the first sub-band covers pixels smaller than the minimum bound of the given band. The offset of the last sub-band covers pixels larger than the maximum bound of the given band.

The number of band and sub-band maybe adaptively adjusted according to the local or global characteristics of the given image of video. A BO type number maybe also be assigned according to usage frequency.

Most frequently used BO type will be assigned the smallest number. FIG. 5 shows an example, where the middle bands are assigned with 1 and 2, and the side bands are assigned with 3 and 4.

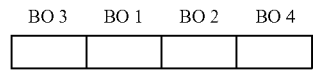

In another embodiment, an increased number of band is used with overlapped sub-band. The number of band maybe set to M, and number of offset can be set to N. M is used to signal the band where offset will be applied. N is the number of sub-band for which the offset will be provided.

For example, where M is set to 16 and N is set to 4, as shown below, the overall pixel range is divided into 16 bands.

The sub-band size is half the band in this case, and each band includes two sub-bands. Since the number of sub-band to signal offset is 4, the range of 4 sub-bands is wider than one band. Hence, there is overlap. In such an example, 4 sub-bands from the second sub-band of $0^{th}$ band to the first band of $2^{nd}$ band are provided with offsets.

Whereas another example, where M is set to 32 and N is set to 4. The overall pixel level range is divided into 32 bands. In this case the size of band is equal to that of sub-band. From the first sub-band in the indicated band, N offsets are provided for each sub-band, where N is 4, as shown below:

Note that the band indices maybe arranged in the order of their usage frequency. In addition, in one embodiment, such a scheme maybe applied for each color component separately, or same offset can be applied for all the color components together. Thus, such a method and/or apparatus is capable of determining sign of offset according to category and not coding it, which may remove visual artifact while facilitating an improved coding efficiency.

In one embodiment, for each band, a certain number of offset is provided. One offset will cover one sub-band range. In other words, the pixels belonging to a sub-band will use corresponding offset. For example, four offsets can be provided for four sub-bands for the selected band. Since the range covered by these four sub-bands is smaller than the range covered by the band, the location in the band is signaled to specify the coverage of the offset. This can be signaled using the sub-band index. For example, where there are four offsets, and if these offsets are provided from sub-band 3 in BO 0, four consecutive sub-bands including sub-band 3 can be covered, e.g., sub-band 3, 4, 5, and 6.

Since the pixel level range is hierarchically divided into band and sub-band, signaling of starting sub-band and offset values maybe efficiently performed in terms of coding efficiency. First, BO type is signaled, and then starting sub-band is signaled followed by the offset values. It is possible to use fixed length coding or variable length coding to code these parameters. Note that same scheme can be applied for both luma and chroma color components. It is possible to signal one parameter set and apply it for all the color components. It is also possible to signal separate parameter set and independently apply it for each color component.

It is also possible to adaptively change the band and/or sub-band coverage and/or number of offsets. For example, using the decoded pixel values after deblock filter process, the pixel level range within the given region can be determined by constructing a histogram, or by simply finding the minimum and maximum values.

In one embodiment, the band index and sub-band index are coded together. For example, where there are two bands and 16 sub-bands in each band, i.e., 1 bit flag can be used to indicate one of two bands, followed by 4 bit flags to indicate one of 16 sub-bands. Such flags can be combined to form 5 bit flags.

Below is an example of simple way to map pixel values to these 5 bit flags, when there are two bands and 16 sub-bands in each band. First, pixel value is right shifted so that it belongs to the range of [0, 31]. In case of 8 bit per pixel, it is right shifted by 3, which divide the whole pixel range into 32 intervals. A 5 bit index is assigned to each interval from 00000 for the left most interval to 11111 for the right most interval.

Figure 7A:
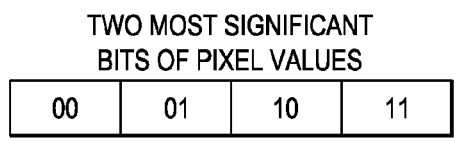
FIG. 7 is n embodiment depicting examples of flag assignment.
Figure 7B:
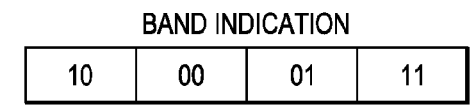
Figure 7C:
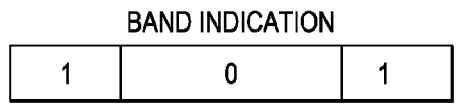

FIG. 7 is n embodiment depicting examples of flag assignment. The two most significant bits are shown in FIG. 7(*a*) and are mapped in FIG. 7(*b*). The three least significant bits are combined with the mapped two most significant bits to generate new index. In this way, the first bit of the five bit flag can indicate either middle band or side band, and the other four bit can indicate 16 sub-band in each band. Table 2 shows this mapping.

TABLE 2

| before mapping | after mapping |
|---|---|
| 00 | 10 |
| 01 | 00 |
| 10 | 01 |
| 11 | 11 |

Let's take an example of this when pixel value is 123, which is 01111011 in binary. After 3 bit right shift, this becomes 01111. Two most significant bits, 01 is mapped to 00, and the three least significant bits, 111 is combined to this to form the final index, 00111. It can be noticed that this belongs to the middle band, since the first bit is 0. Hence, one advantage is a reduced buffer size to store SAO parameters by reducing number of band offset, which improves coding efficiency.

While the foregoing is directed to embodiments of the present invention, other and further embodiments of the invention may be devised without departing from the basic scope thereof, and the scope thereof is determined by the claims that follow.

What is claimed is:

1. A system comprising:
    a video capture component configured for capturing a sequence of pictures, each picture represented by an array of component pixel values for one or more components, each component pixel value comprising binary word;
    a video encoder component coupled to the video capture component, the video encoder component configured for:
        dividing video information pertaining to a picture into coding units;
        determining a starting band for band offset sample adaptive filtering for a coding unit, the starting band identified by five most significant bits of each component pixel value associated with the starting band; and
        determining offset values for four contiguous bands including the starting band and three adjacent bands;
    an entropy encoder coupled to the video encoder, the entropy encoder configured for encoding the sample adaptive starting band, and exactly four offset values, each of the four offset values for one of the four contiguous bands; and
    a transmitter coupled to the entropy encoder and configured for transmitting entropy encoded data.

2. The system of claim 1, the video encoder component configured for determining the starting band and the offset values by reconstructing component pixel values for the coding unit and using the reconstructed component pixel values to determine the starting band and the offset values.

3. The system of claim 1, the video encoder component configured for generating a merge signal indicating the coding unit is to utilize sample adaptive offset parameters from another coding unit.

4. The system of claim 1, the video encoder component configured for generating a starting band and four offset values for a block of luma component pixel values.

5. The system of claim 1, the video encoder component configured for generating a starting band and four offset values for a block of chroma component pixel values.

6. The system of claim 1, the video encoder component configured for generating, for each chroma component in a block of pixel values, a separate starting band and four separate offset values.

7. The system of claim 1, the video encoder component configured for generating a single starting band and a single set of four offset values for both the luma component and all chroma components in a block of pixel values.

8. The system of claim 1, the video encoder component configured for generating a starting band and four offset values for the luma component in a block of pixel values, and generating a single starting band and a single set of four offset values for all chroma components in a block of pixel values.

9. A method of encoding video comprising:
capturing a sequence of pictures, each picture represented by an array of component pixel values for one or more components, each component pixel value comprising binary word;
dividing video information pertaining to a picture into coding units;
determining a starting band for band offset sample adaptive filtering for a coding unit, the starting band identified by five most significant bits of each component pixel value associated with the starting band; and
determining offset values for four contiguous bands including the starting band and three adjacent bands;
encoding the sample adaptive starting band, and exactly four offset values, each of the four offset values for one of the four contiguous bands; and
transmitting entropy encoded data.

10. The method of claim 9, comprising reconstructing component pixel values for the coding unit and using the reconstructed component pixel values to determine the starting band and the offset values.

11. The method of claim 9, comprising generating a merge signal indicating the coding unit is to utilize sample adaptive offset parameters from another coding unit.

12. The method of claim 9, comprising generating a starting band and four offset values for a block of luma component pixel values.

13. The method of claim 9, comprising generating a starting band and four offset values for a block of chroma component pixel values.

14. The method of claim 9, comprising generating, for each chroma component in a block of pixel values, a separate starting band and four separate offset values.

15. The method of claim 9, comprising generating a single starting band and a single set of four offset values for both the luma component and all chroma components in a block of pixel values.

16. The method of claim 9, comprising generating a starting band and four offset values for the luma component in a block of pixel values, and generating a single starting band and a single set of four offset values for all chroma components in a block of pixel values.

17. The system of claim 1, the video encoder component configured for mapping two most significant of the five most significant bits to a two bit value with one bit of the two bit value indicating whether the starting band identified by the five most significant bits is in a middle range of potential starting bands.

18. The system of claim 1, the video encoder component configured for determining the starting band and offset values for a first video component, and further determining additional offset values for a second video component.

19. The method of claim 9, further comprising mapping two most significant of the five most significant bits to a two bit value with one bit of the two bit value indicating whether the starting band identified by the five most significant bits is in a middle range of potential starting bands.

20. The method of claim 9, further comprising determining additional offset values for a second video component.

* * * * *